United States Patent [19]

Fosdick

[11] Patent Number: 4,866,718
[45] Date of Patent: Sep. 12, 1989

[54] ERROR TOLERANT MICROPROCESSOR
[75] Inventor: Robert E. Fosdick, Austin, Tex.
[73] Assignee: Galaxy Microsystems, Inc., Austin, Tex.
[21] Appl. No.: 89,221
[22] Filed: Aug. 25, 1987
[51] Int. Cl.$^4$ .............................................. G06F 11/00
[52] U.S. Cl. .................................. 371/40.1; 371/21.1
[58] Field of Search ...................... 371/16, 21, 38, 39, 371/67, 69; 364/200, 900

[56] References Cited

U.S. PATENT DOCUMENTS

| | | | |
|---|---|---|---|
| 4,175,692 | 11/1979 | Watanabe | 371/38 |
| 4,621,363 | 11/1986 | Blum | 371/16 |
| 4,621,364 | 11/1986 | Tschoepe | 371/21 |
| 4,625,312 | 11/1986 | Bashaw | 371/16 |
| 4,639,917 | 1/1987 | Furuta | 371/16 |
| 4,649,537 | 3/1987 | Rosswurm et al. | 371/16 |

FOREIGN PATENT DOCUMENTS 0080354  6/1983  European Pat. Off. .............. 371/21

OTHER PUBLICATIONS

Diehl, et al., Considerations for Single Event Immune VLSI Logic, IEEE Transactions on Nuclear Science, vol. NS-30, No. 6, Dec. 1983, pp. 4501-4507.
Nicohols, et al., Trends in Parts Susceptibility to Single Event Upset from Heavy Ions, pp. 1-15.
Diehl-Nagle, et al., Single Event Upset Rate Predictions for Complex Logic Systems.
Friedman, et al., Single Event Upset in Combinatoria and Sequential Emitter Coupled Logic.
Tront, et al., Software Techniques for Detecting Single-Event Upsets in Satellite Computers, Nuclear & Space Radiation Effects/IEEE Conf., Jul. 1985, pp. 1-5.
Koga, et al., Techniques of Microprocessor Testing and SEU-Rate Prediction.

Primary Examiner—A. D. Pellinen
Assistant Examiner—Geoffrey S. Evans
Attorney, Agent, or Firm—Arnold, White & Durkee

[57] ABSTRACT

A microprocessor that detects and corrects random soft errors during program execution occurring in its storage elements (memory). Such a microprocessor utilizes a bit serial architecture and single error correction double error detection techniques that automatically detect and correct soft errors occurring in its internal memory elements during each word cycle. The microprocessor automatically detects and corrects soft errors during each word cycle. The error detection and correction is transparent to the external microprocessor interface. The microprocessor also utilizes a multi-level hierarchical structure which maintains a high instruction execution throughput and also minimizes the number of transistors required for its implementation.

21 Claims, 5 Drawing Sheets

ERROR TOLERANT MICROPROCESSOR

BACKGROUND OF THE INVENTION

Computers utilize a large number of semiconductor components. In a space environment, the operational reliability of computers utilizing small-geometry semiconductor parts has become severely compromised. In this environment, the chips, especially those utilizing less than three micron geometry, suffer random errors due to the presence of cosmic rays or high energy particles or ions. The geometries of the newer semiconductor parts are so small that passage of a high energy particle/ion or cosmic ray through the p-n junction of a semiconductor device sometimes causes an upset in the operation of the device. In memory systems, the problem occurs when a cosmic ray or high energy particle/ion passes through a sensitive junction in a storage element (e.g. a stage of a shift register) internal to a circuit and results in an arbitrary change-in-state of that storage element. The result in a memory is that a state of "zero" becomes a state of "one" or vice versa. This phenomenon of one change of state is called a Single Event Upset (SEU). SEU, sometimes, is also referred to as a bit flip-flop or a soft error. This soft error is temporary in nature and disappears when the memory is re-used for storing a new bit.

Therefore, unless there is a means to determine the logic state in which the storage element is supposed to be, the system will have no means of determining that an upset has occurred, and will operate as if the erroneous logic state is correct. Further, the failure mode resulting from a SEU in a storage element is random and therefore unpredictable.

Single Error Correction Double Error Detection (SECDED) coding techniques have long been used in semiconductor memory systems to increase their reliability. In an Error Detection and Correction (EDAC) of memory system, a SECDED code word is stored with each word of memory. Each time a memory word is accessed, both the data word and the code word are output and the code word is used to check the validity of the data word. Single errors detected are corrected prior to the use of the data and the corrected word is stored back in memory. This type of correction technique will handle SEU's occurring within a memory, providing that the entire memory is checked at sufficient intervals so that any given memory word will not accumulate more than one SEU between being checked.

The storage elements or the internal memory within a bit-parallel architecture microprocessor or Central Processing Unit (CPU) present a more complex problem because typically they are in a less ordered structure, and with many operations going on in parallel it is very difficult to maintain their relationship and determine in real time how far an error has propagated. Most present techniques used to solve the SEU problem in a random logic circuit such as a CPU, involve making the storage elements immune to upset by adding resistance in the feedback paths of the latches. The resistance in conjunction with the device capacitance functions as a filter which reduces or eliminates the effect of impulse (cosmic ray or high energy particle/ion) that may cause an upset. The principal drawbacks of these techniques are that the additional components require additional area on the chip and result in a reduction of operating speed. It is anticipated that present methods of SEU prevention will become less effective as device geometries continue to become smaller, thereby requiring higher resistance values or addition of more capacitance to the nodes.

SUMMARY OF THE INVENTION

This invention is directed to a method and an apparatus for detecting and correcting random soft errors occurring during program execution in a digital memory or storage element. In general terms, the system of the invention enables the storage elements to get upset and then corrects any bit error or bit change on a continuing cycle. Implementation of the invention in a microprocessor can be bit-serial or various widths of bit parallel (usually a power of 2). A bit-serial approach is very ordered and requires much less components than bit-parallel approaches. In a bit serial approach, the operations are synchronous and all signal propagations are predictable. In a CPU using a bit-serial implementation in conjunction with conventional memory EDAC techniques, an error detection and correction architecture is derived. A major change marking the invention is that the bit error checking is done on bit positions across the complement of registers; as explained above, current methods use EDAC on a data word basis. The latter technique would not be suited to the present invention, since an operation on a data word in a CPU would be completed before it could be determined if the data contained any error. However, by implementing the EDAC across bit positions, the checks are made in real time with the CPU functions where each bit is checked just before entering the operating circuitry-arithmetic-logic unit. If a bit so checked is not yet needed for operation, it may be recirculated to the memory. The data operated on is therefore always correct, and the correction of already operated on data is not required.

The invention is particularly directed to a single chip microprocessor with in line, real time, soft error detection and correction of internal registers utilizing a bit serial architecture. The microprocessor automatically detects and corrects internal soft errors during each word cycle. This detection and correction of a soft error is transparent to the device interface. The architecture uses a multi-level hierarchical control structure that maintains a high instruction execution throughput and also minimizes the number of transistors required for its implementation.

Examples of the more important features of this invention have thus been summarized rather broadly in order that the detailed description thereof that follows may be better understood, and in order that the contribution to the art may be better appreciated. There are, of course, additional features of the invention that will be described hereinafter and which will also form the subject of the claims appended hereto.

These and other features and advantages of the present invention will become apparent with reference to the following detailed description of a preferred embodiment thereof in connection with the accompanying drawings wherein like reference numerals have been applied to like elements, in which:

DESCRIPTION OF THE PREFERRED EMBODIMENT

Figure 1:
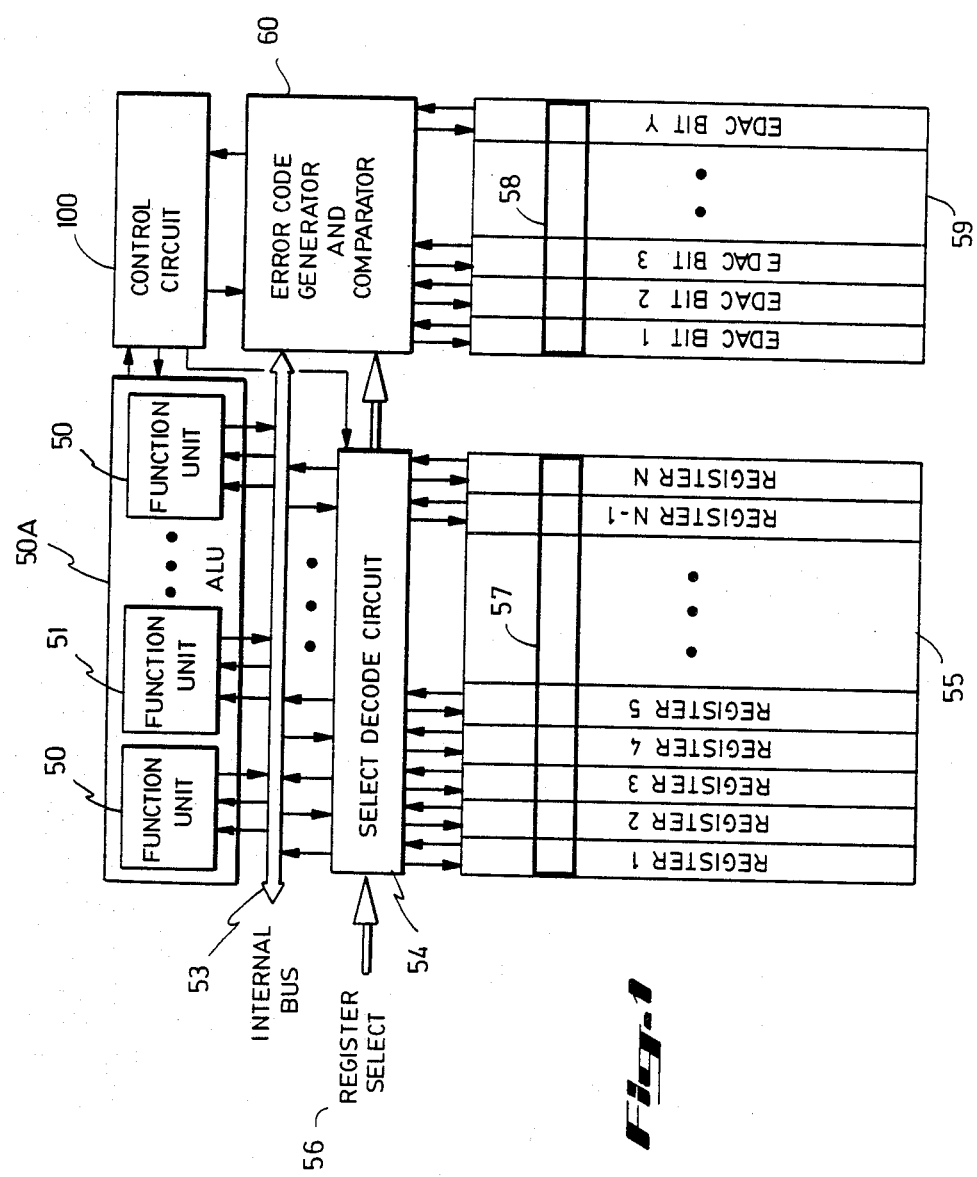
FIG. 1 is a block diagram of the organization of a central processing unit using bit-serial architecture.

In a preferred embodiment, this invention consists of a microprocessor and a method of operation in which bit errors, occurring in the internal memory of a microprocessor are detected and corrected on a continuing cycle. The methods and structure disclosed are especially useful in microprocessor apparatus, but are not limited to microprocessors.

The specific embodiment illustrated in the drawings is a single chip microprocessor (central processing unit or CPU) using a bit serial architecture. It is preferred that the microprocessor is fabricated on a gallium arsenide substrate because this material affords higher operating speed.

As illustrated in FIG. 1, the architecture utilizes a set of multi-stage serial data shift registers 55 to store data and instruction words (bits) in bit serial fashion. A set of multi-stage shift registers 59 is used to store error code word bits 58 corresponding to a parallel set of bits 57. (Multi-bit error Correctable Word or ECW) in the data shift registers. The shift registers 59 may be parallel or serial shift registers. An error code generator and comparator circuit shown as block 60 is used to generate and compare error codes based on well known single error correction double error detection (SECDED) coding techniques. A select code circuit 54 coupled to a bidirectional data bus 53 communicates with the data shift registers 55. Function units 50–52 or any standard arithmetic logic unit (ALU) may be used to perform basic arithmetic and logic operations. A control circuit 100 is used to control the operations of the central processing unit.

Figure 2:
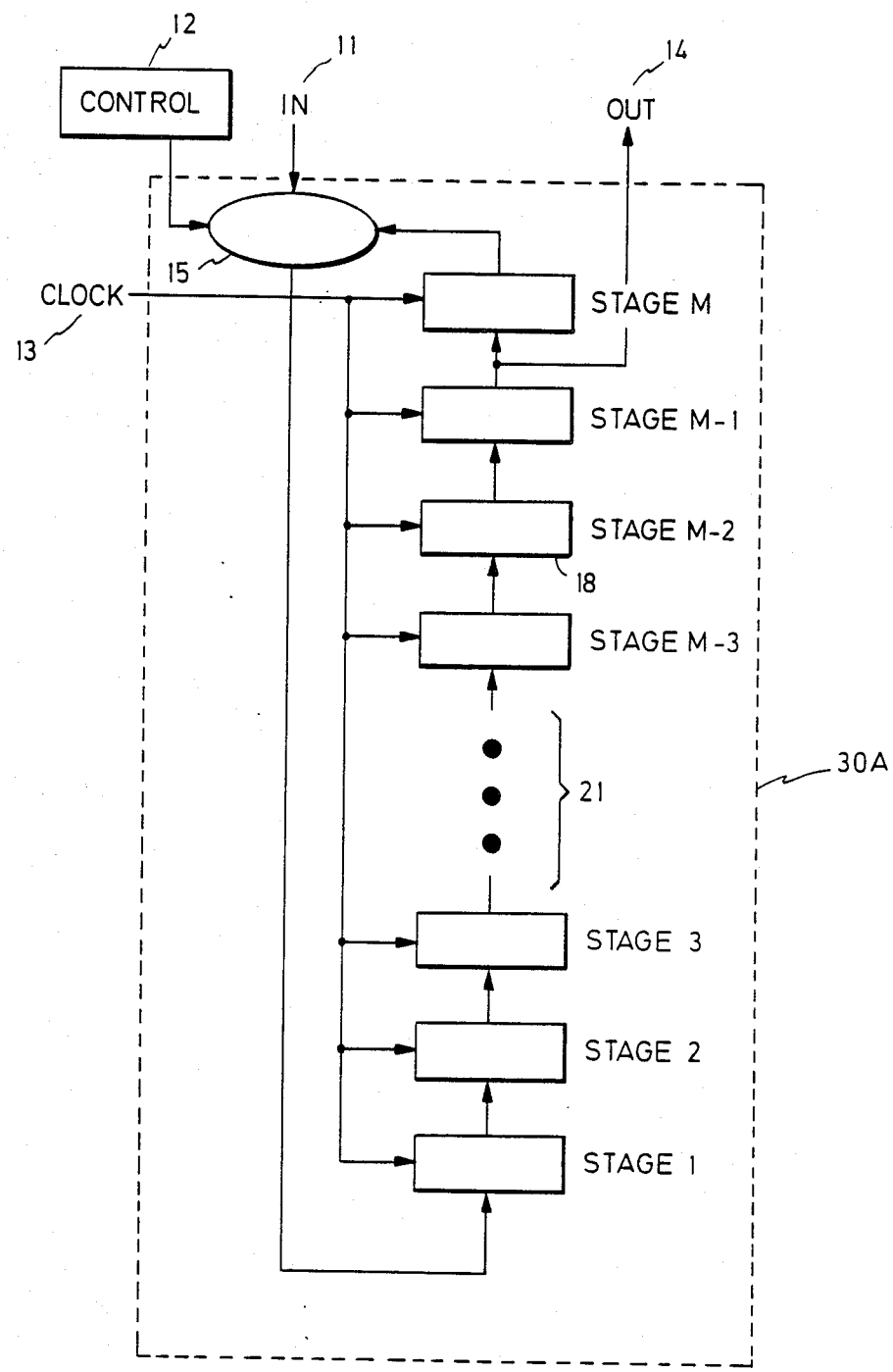
FIG. 2 illustrates the structure of a bit-serial
Figure 3:
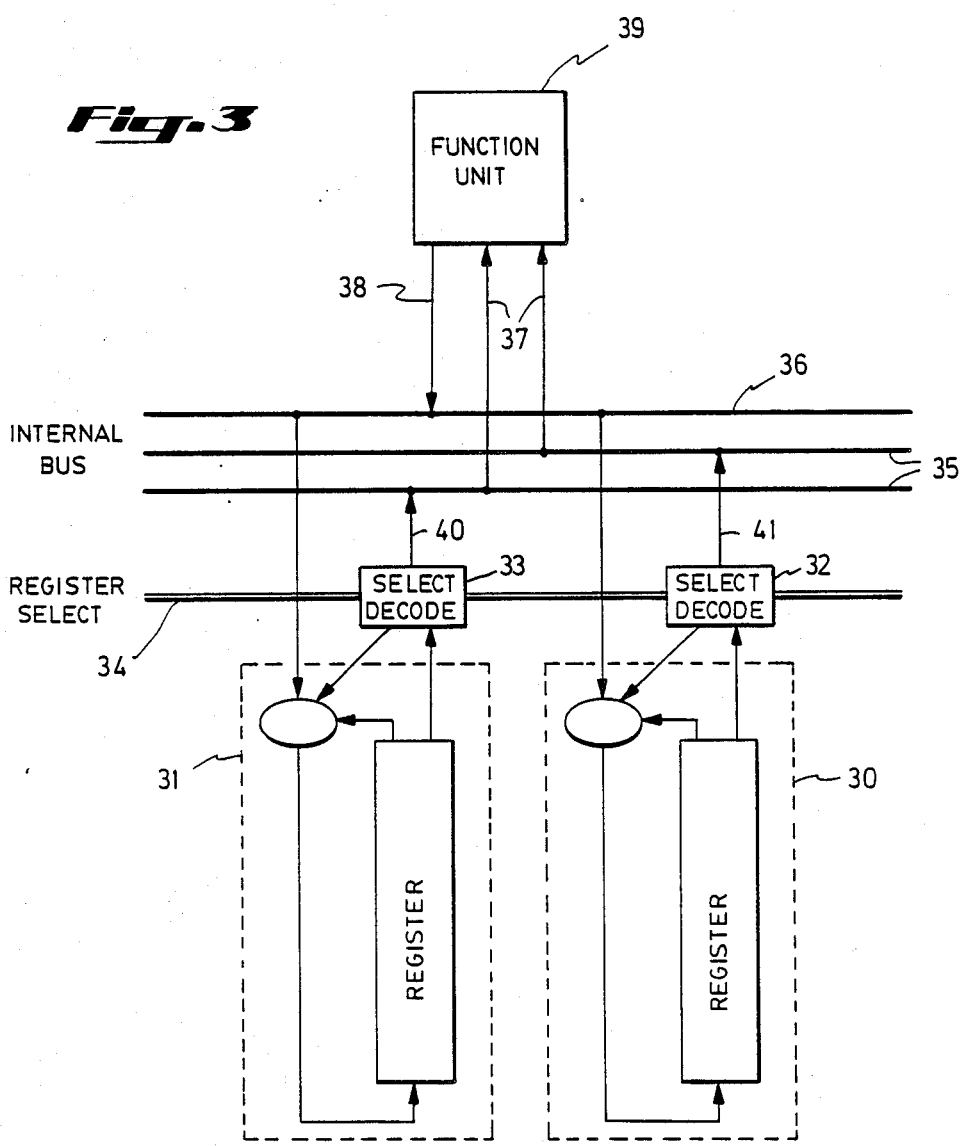
FIG. 3 is a block diagram illustrating execution flow of data and instructions.

To understand the detailed operations of the central processing unit and the method of detecting and correcting bit errors or SEU's, it is helpful to first understand the details of FIG. 2 and FIG. 3.

FIG. 2 shows a block diagram of a bit serial shift register 30A, similar to that used to implement storage registers (memory) 55 and 59 in the CPU chip of FIG. 1. Each such register 30A comprises a plurality of stages 1-M. Stage 1 and Stage M may also be referred to as the first or input stage and last or output stage, respectively. The value of M is dependent upon the number of bits in a data word that needs to be stored in each register 30. Each stage, i.e. Stage 1 through Stage M is a storage element where one bit of data is temporarily retained between shift pulses. Stage M is defined to be the output or last stage of the register 30A. M, of course, is also the total number of stages. Element 21 implies that the length of the shift register 30A can vary depending on the specific requirements of a CPU or any other device utilizing the method of this invention.

A continuous clock signal or pulse 13 is input to all stages of the shift register 13. This clock signal 13 transfers data from one stage to the next in synchronism, i.e., the contents in stage 1 transfer to stage 2 while the contents of stage 2 transfer to stage 3, etc., etc. During normal operation, when contents or bits of a particular register are needed to be retained in the memory or storage system 55 of FIG. 1, the bit or content of stage M is transferred or recirculated to stage 1 via the recirculating control block 15. All bits that belong to a data word to be stored are likewise recirculated. Therefore, when in a recirculating mode, data bits belonging to a data word will return to the same stage every M clock signals or clock pulses.

External data is entered into the register 30A through single input 11. The control input 12 determines whether the register retains the current contents or loads in new data.

The data input 11 passes through the recirculating control block 15 into stage 1 one bit at a time each clock period. The loading of a complete data word of length M will take M clock periods resulting with the first bit of the data word loaded contained in stage M and the last bit of the data word loaded in Stage 1. After M clock periods of the loading of new data, the control 12 is changed, if desired, to recirculate mode in order to retain the new data just loaded.

The contents of the register 30A are output 14 serially from a designated stage of the register. The stage selected to output from is dictated by the remainder of the chip design. In some cases, more than one stage is output simultaneously by means of multiple taps to the corresponding positions of the register.

FIG. 3 illustrates a block diagram of a section of a CPU similar to that in FIG. 1 that will execute a defined set of functions. The two sources of data are the two selected, identical shift registers 30, 31. The two shift registers 30, 31 are each identical to the shift register 30A of FIG. 2. Other similar registers are not shown in FIG. 3 but they combine to form the complete register set 55 in the CPU implementation shown in FIG. 1. Each register in FIG. 3 is given an identification number or an address which is contained in its respective select decodes 32, 33. The set of select decodes 32 and 33 and still others like these two circuits combine to form the select decode circuit 54 shown in FIG. 1. The selection designators defining the sources and destination of data are placed on the register select bus 34 which is routed in parallel to the select decode circuit of all the registers. The data outputs 40, 41 from the registers 31, 30 selected by comparing identification codes are routed to the internal bus input lines 35. The two inputs 37 of the function unit 39 are also connected to the internal bus input lines 35.

The function unit 39 in FIG. 3 performs basic arithmetic and logical operations on the two data inputs 37. These basic operations are ADD, OR, AND, and XOR with the capability to complement the inputs and output, to force a carry-in, and to enable/disable operations on a bit time basis. The serial output 38 from the function unit 39 is connected to the output line 36 of the internal bus for storage into the selected destination register. FIG. 3 represents the typical flow of data for each word (N bits) operation. Multiple passes through a functional unit are generally required to complete the execution of many of the instruction functions (multiple, divide, indexing, etc.).

There can be multiple function units 39 in a CPU implementation. FIG. 1, for example, shows units 50, 51, and 52 with the operation set of each such unit tailored to the specific execution or operand derivation functions assigned to it. The number of duplicate input and output lines 35 and 36 in the internal bus depends on the ability to assign registers to the various bus lines 35, 36 such that bus conflicts will not occur while the function units 39 are operating simultaneously.

The register select input 56 in FIG. 1 to the select decode 54 includes source and destination identifiers of register to internal bus 53 connections for each of the function units 50, 51, and 52. The internal bus 53 will contain multiple input and output lines as required by the multiple function units 50, 51, and 52 such that the required selection of registers will not cause a bus conflict.

The N registers in the register set 55 are positioned adjacent to each other. This structure is analogous to a N-track drum memory, where N is the number of tracks (registers). All of the registers will circulate, i.e., shift bits from one stage to the next in synchronism such that bits 57 appearing laterally will always maintain their relative position to each other while progressing through stages of their respective shift registers. This horizontal word 57 is defined for the purposes of the invention as an error correctable Word (ECW). Bit errors within the ECW 57 are detected and corrected using conventional 2-bit error detection, single bit error correction schemes (Hamming Code, etc.). The error codes for the respective ECW's (58) are contained in laterally adjacent registers 59 structured identically to the register set 55. The number of bits Y in the error code, which dictates the number of error code registers 59, is dependent on the number of registers N in the register set 55. The error code 58 and its respective ECW 57 shift through the register structures together. As shown in FIG. 1, each set of N data bits has its own error code shifting with it from the first to the last stage of the register structure 55 and 59.

The checking, detection, and correction of errors within each ECW 57 are accomplished when the data is output from the top of the register set 55 into the decode select 54. The checking of each ECW with corresponding error code is accomplished in the error code generator and comparator circuitry 60. A detected error associated with an input to a function unit 50, 51, 52 is corrected by switching the corrected data bit onto the appropriate internal bus line. Correction of recirculating data is accomplished by selecting the appropriate register and inputting the corrected data bit through the internal bus correction line 35. The internal bus correction line 35 is a single bus line available to all register loads, as the scheme is only valid to correct a single bit error. An error detected in the error code is not corrected, since a new error code is generated for each ECW as it is loaded back into the bottom of the register set 55.

The corresponding error code 58 of each ECW 57 is generated from the register data being recirculated back into the bottom of the registers in conjunction with new data being output from the function units 50, 51, 52 through the internal bus 53. The new error code is loaded back into the bottom of the error code registers 59 in concert with the corresponding ECW being loaded back into the register set 55.

A word cycle is defined as the number of bit times required to circulate a given bit or ECW from the bottom of the register set 55 to the top and back to the bottom ending up in the position in which it started. The ECW 57 for each bit is checked once every word cycle, when it reaches the top of the register set 55. There is a check of a given ECW being accomplished every bit time. A new error code is generated for a given ECW once every word cycle as the ECW is being loaded into the bottom of the register set 55. There is a different error code being generated each bit time for the corresponding ECW's as they circulate to the top of the register set 55.

The organization of the storage registers internal to a CPU in the manner shown in FIGS. 1-3 provides for the continuous real time monitoring of the data contents of all the bits each word cycle (e.g. 16-bit times for a 16-bit word). By implementing the check horizontally by bit zone rather than vertically by word, any bit error detected can be corrected prior to any use of the data in performing an operation or prior to it being loaded back into the register. This error detection and correction technique is performed internal to the chip and is transparent to the signals interfacing the CPU.

Multiple bit errors within the register set 55 will not affect most standard EDAC techniques providing there is no more than one error per ECW. If the ability to correct multiple bit errors within an ECW is desired, a more elaborate EDAC scheme is necessary. This can be accomplished by using a more sophisticated code or by breaking the ECW into subsets with an individual SECDED code for each subset.

FIG. 1 illustrates the organization of a microprocessor (CPU) chip with the relationships of multiple function units 50, 51, 52, the internal bus 53, the select decode 54, the set of registers 55 and 59, an error code generator and comparator circuitry 60, and a control circuit 100.

As shown in FIG. 1, the input to and the output of each register is connected to the select decode 54. Each register in the set 55 is identical to that shown in FIG. 2. The register select input 56 to the select decode 54 includes source and destination identifiers of register to internal bus 53 connections for each of the function units 50, 51, 52. The internal bus 53 will contain multiple input and output lines as required by the multiple function units 50, 51, 52 such that the required selection of registers will not cause a bus conflict.

Figure 4:
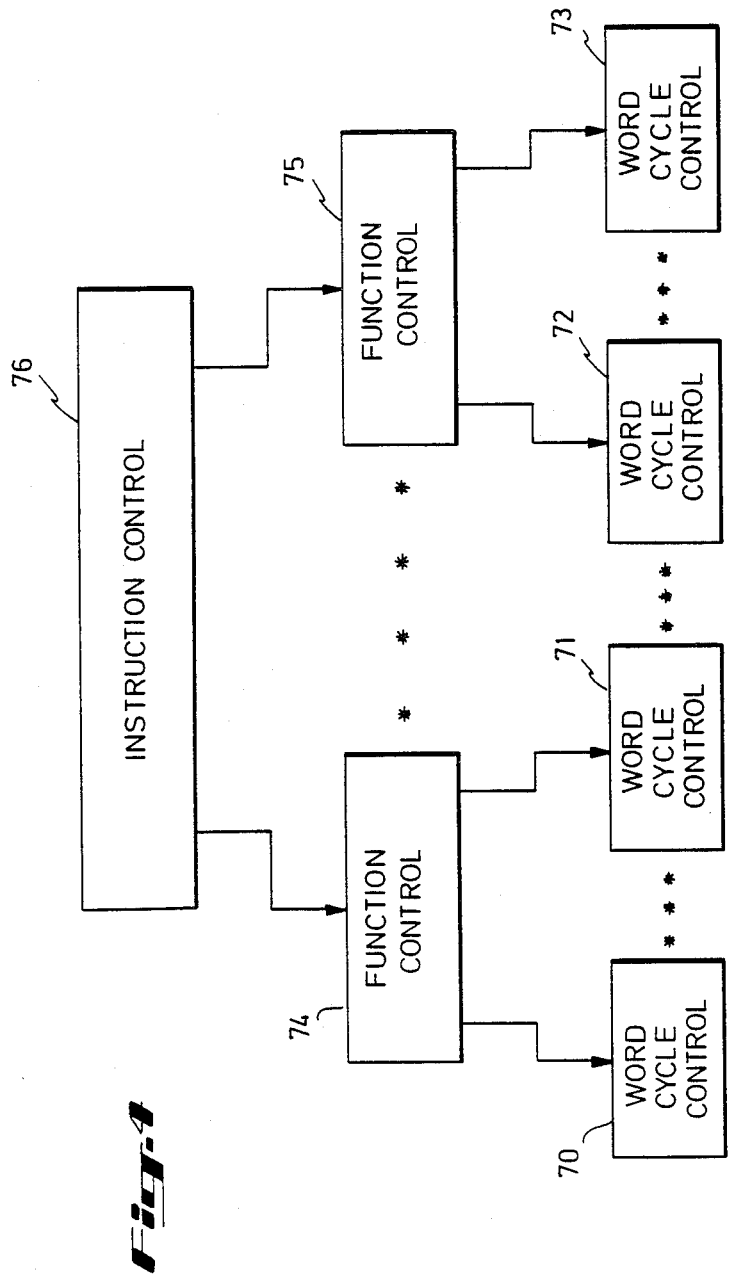
FIG. 4 is a block diagram of instruction decode and execution circuitry.

FIG. 4 illustrates a preferred hierarchical diagram of the control structure required in FIGS. 1-3. The bit serial internal organization allows sufficient length word cycles for the control function to propagate through a hierarchy. The use of small, dedicated control circuitry at the lowest level reduces the overall transistor count because the use efficiency of the control functions and/or microcontrol bits is higher. The overall chip control function is organized into multiple levels which can be implemented with either hardwired or microcontrol techniques. FIG. 4 shows three levels of control, however, the number of levels may be more or less depending on the speed, efficiency, and complexity of the CPU.

The lowest level of control is at the word cycle, which is the control circuitry that defines the bit level operations within a word time (M-bits). All word cycle control functions complete in one word cycle time. There will be multiple word cycle control 70, 71, 72, 73 elements within the chip implementation. All word cycle control elements may be physically combined into a word control circuit. A word cycle control 70 element issues the control signals that define the basic operations (Add, Increment, Subtract, AND, Compare, OR, Decrement, etc.). The word cycle control elements are associated with the individual function units 50, 51, and 52 in FIG. 1 and define ALU function, data input polarity, and bit-field timing. The number of function units 50, 51, 52 and word cycle control 70, 71, 72, 73 elements depend on the grouping of registers associated with the various CPU operations (Interrupt servicing, Timers, Operand Derivations, Instruction Counter, Execution, etc.) and on the degree of paralleling or pipelining of operations implemented.

The word cycle control 70 element is simple to implement. All functions are completed in one word cycle (M bits). There are no data dependent decisions to make and no interactions with other word cycle control elements 71-73. The word cycle control is most efficiently implemented with hard wired design technique. The initiation of word cycle control elements 70-73 is accomplished by the function control 74, 75, which are the second level of control. The function control 74, 75 may be physically combined in a function control circuit.

Function control 74, 75 sections implement complete functions or algorithms. The object of a function control 74 section is to provide a sequential flow of instructions to the word cycle control 70, 71 elements as required to execute a complete function which may include testing, branching, and calling subroutines. There may be one or more word cycle control 70, 71 elements per function control 74 section. Examples of multi-word cycle functions or algorithms that would be implemented by a function control 74 section are multiply, divide, normalize, operand address derivation, acknowledge interrupts, and double precision operations. There may be one or more function control 74, 75 sections implemented in the control system activated by the instruction control 76, which is the top level of control.

The instruction control 76 initiates and monitors the sequences of functions in their proper order. The instruction control 76 is responsible for issuing the commands to the various function control 74, 75 sections in the proper order that result in the execution of CPU instructions—Fetch, Operand Derivation, and Execution. CPU utilities (Initialization, Interrupt Service, Built-in Test, CPU Status, etc.) are also initiated through the instruction control. The instruction control 76 forces synchronization between function control 74, 75 sections when interaction is required.

Figure 5:
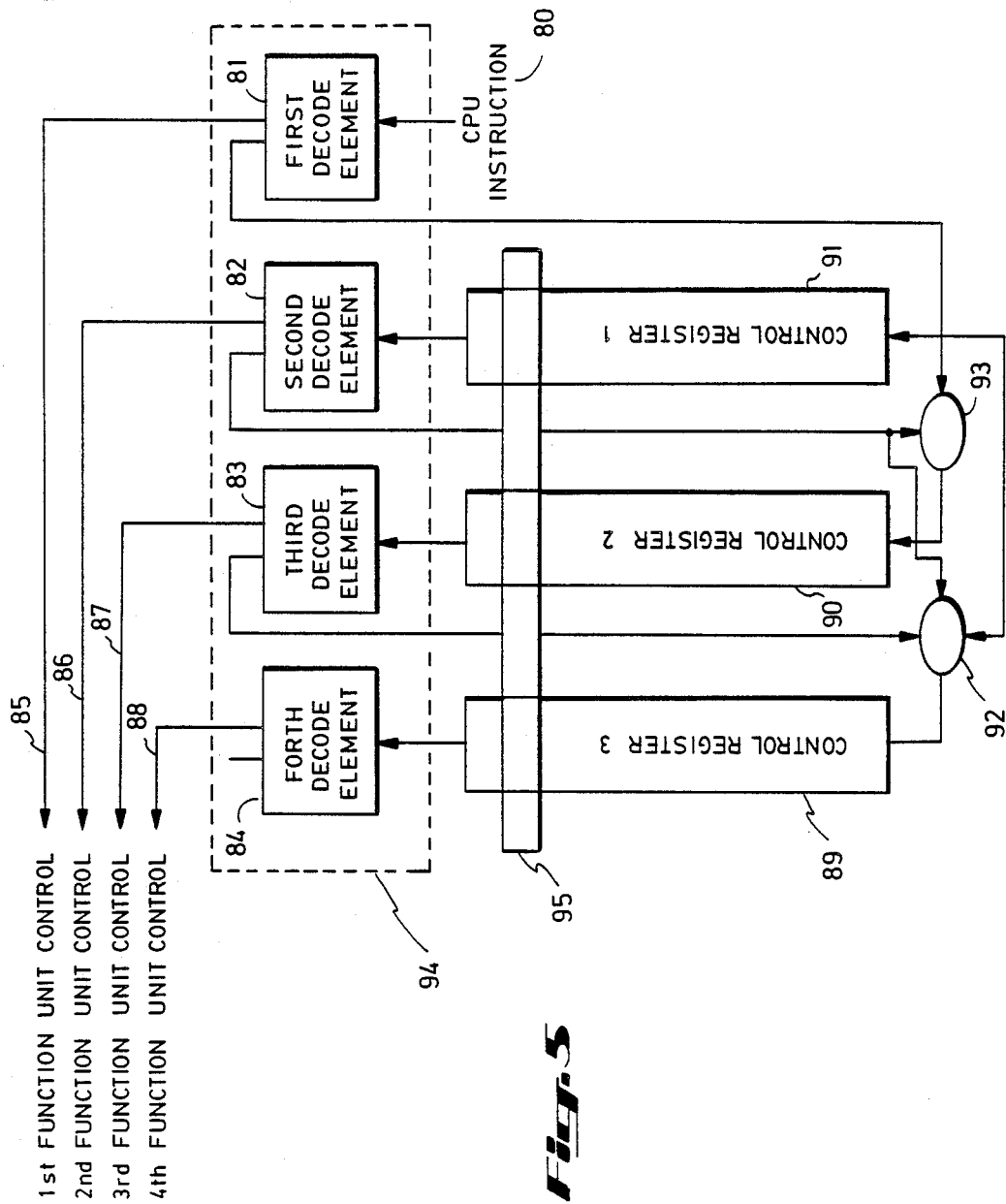
FIG. 5 is a block diagram of a multi-level control hierarchy which minimizes the number of transistors necessary for the control circuitry.

FIG. 5 illustrates the block diagram of the elements to progressively decode the CPU (macro) instructions and generate the control commands to the various lower level function units. This structure is in keeping with the bit serial implementation and cross bit checking in the control registers 89, 90, 91 which contain the next cycle control descriptions. The CPU instruction 80 is serially input to the first decode 81 which was enabled by the instruction control which was discussed in reference to FIG. 4. The multiple decode elements 94 make up what is referred to a function control in FIG. 4. The control lines 85, 88 transfer the commands to the word cycle control units that control the corresponding function units.

The first decode 81 translates the CPU instruction into a control word (output at 85) to perform an operation by its corresponding function unit and into a next level control instruction, which is input into the appropriate control register 89, 90, 91. Each word cycle control-function unit has a dedicated set of micro operations that it can perform. Each control instruction generated from a decode unit contains the information on which operation is to be performed by circuitry it controls as well as which control register is to be selected and loaded for the next operation in the execution sequence. Select gates 92, 93 provide the paths from the various decode elements 81, 82, 83 to the control register next in line.

FIG. 5 portrays the use of 3 control registers which could indicate three level deep pipeline implementation. However, the principle can be extended to any number of control registers desired. Each decode element can be implemented to send commands to more than one word cycle control.

In the overall organization of the microprocessor the control registers are an extension of the register block 55 shown in FIG. 1. The cross bit checking is performed in junction with the data registers. Bit cross section 95 is an extension of bit cross section 57, 58 in FIG. 3. Error detection and correction is performed simultaneously across the control registers and the data registers minimizing the circuit overhead.

The foregoing description has been directed to particular embodiments of the invention in accordance with the requirements of the patent statutes for the purposes of illustration and explanation. It will be apparent, however, to those skilled in this art that many modifications and changes in the apparatus and method set forth will be possible without departing from the scope and spirit of the invention. It is intended that the following claims be interpreted to embrace all such modifications and changes.

What is claimed is:

1. A microprocessor adapted for detecting and correcting soft errors occurring during program execution, the microprocessor comprising:
   (a) a plurality of multi-stage data serial shift registers, each said register storing in bit serial fashion data and instructions for the microprocessor, each said stage of said data shift registers having a corresponding stage in each of the other said data shift registers, the data stored in each set of corresponding stages of said data shift registers defining a multi-bit error correctable word;
   (b) a multi-stage multi-bit parallel shift register, each stage of said parallel shift register storing a multi-bit error code word, each said error correctable word having an associated error code word stored in said parallel shift register;
   (c) an error code generator responsive to error correctable words for generating,
      (i) an associated error code word for the error correctable word at the input of said data shift registers, and
      (ii) a check error code for the error correctable word at the output of said data shift registers;
   (d) an error cod comparator responsive to said error codes for generating an error signal when said error codes do not match; and
   (e) a data correction means responsive to said error signal for correcting said output error correctable word.

2. A microprocessor as defined in claim 1 wherein each said multi-stage data serial shift register contains equal number of stages and a recirculating control circuit for recirculating a bit and entering a new bit into the first stage of said shift register.

3. A microprocessor as defined in claim 1 wherein said parallel shift register comprises a plurality of bit serial shift registers, each said bit serial shift register containing equal number of stages.

4. A microprocessor as defined in claim 1 wherein said error code generator generates the associated error code word prior to its corresponding error correctable word entering into the input stages of said data serial shift registers and based on single error correction double error detection techniques.

5. A microprocessor capable of detecting and correcting errors occurring in its memory during program execution, the microprocessor comprising:
  (a) a plurality of multi-stage data serial shift registers and a plurality of multi-stage error code serial shift registers, each of said registers having the same number and sequence of stages, such that each stage has a corresponding stage in the sequence of each other register, said registers shifted in synchronism through their respective sequences;
  (b) an error code generator and comparator circuit operable to
    (i) generate and enter into the first stages of said error code shift registers a set of bits (error code), said error code being indicative of the corresponding set of bits (error correctable word) in the first stages of said data shift registers;
    (ii) generate a separate second error code in response to each error correctable word leaving the last stages of said data shift registers;
    (iii) compare each second error code with its respective first error code to detect any bit change in its corresponding error correctable word; and
  (d) a select decode circuit responsive to said error code generator and comparator to correct the bit change in the error correctable word leaving the last stages of said data serial shift registers.

6. A microprocessor as defined in claim 5 including a clock operable to synchronously shift bits from stage to stage in the serial shift registers.

7. A microprocessor as defined in claim 5 wherein said error code generator and comparator generates said error codes based on single error correction double error detection techniques.

8. A microprocessor as defined in claim 5 wherein said select decode circuit comprises a plurality of select decodes, each said select decode containing the address of a separate data shift register.

9. A microprocessor adapted for detecting and correcting soft errors occurring during program execution, the microprocessor comprising:
  (a) a bidirectional bus;
  (b) an arithmatic logic unit coupled to the bus for executing a program;
  (c) a control circuit coupled to the arithmatic unit and the bus for providing control instructions to the microprocessor responsive to said control circuit;
  (d) a memory for storing data and instructions during program execution, the memory comprising a plurality of multi-stage data serial shift registers, each said register storing in bit serial fashion data and instructions for the microprocessor, each said stage of said data shift registers having a corresponding stage in each of the other said data shift registers, the data stored in each set of corresponding stages of said data shift registers defining a multi-bit error correctable word;
  (e) a multi-stage multi-bit parallel shift register, each stage of said parallel shift register storing a multi-bit error code word, each said error correctable word having an associated error code word stored in said parallel shift register;
  (f) an error code generator responsive to error correctable words for generating,
    (i) an associated error code word for the error correctable word at the input of said data shift registers, and
    (ii) a check error code for the error correctable word at the output of said data shift registers; or responsive to said
  (g) an error code comparator error codes for generating an error signal when said error codes do not match;
  (h) a data correction means responsive to said error signal for correcting said output error correctable word.

10. The microprocessor as defined in claim 9 wherein said control circuit is of a multi-level hierarchical architecture comprising the levels of:
  (a) a word control circuit to define bit level operations within a word cycle;
  (b) a function control circuit coupled to the word control circuit to implement complete functions and algorithms by providing sequential flow of instructions to said word control circuits; and
  (c) an instruction control circuit coupled to said function control circuit to initiate, monitor the sequence of functions and issue commands to said function control circuit.

11. The microprocessor as defined in claim 9 wherein said shift registers are recirculating type.

12. The microprocessor of claim 9 wherein each said serial shift register further comprises a recirculating control circuit for recirculating a bit and entering a new data bit into the first stage of said shift register.

13. The microprocessor as defined in claim 9 wherein said microprocessor comprises a single chip using a gallium arsenide substrate.

14. The microprocessor as defined in claim 9 said control circuit is a hierarchical type control circuit comprising multiple levels.

15. A microprocessor adapted for detecting and correcting soft errors occurring during program execution, the microprocessor comprising:
  (a) a bus;
  (b) an arithmatic logic unit for executing program instructions and for performing arithmatic and control functions;
  (c) a control circuit having a multi-level hierarchical structure, comprising the levels of:
    (i) a word control circuit to define bit level operations with a word cycle;
    (ii) a function control circuit coupled to the word control circuit to implement complete functions or algorithms by providing sequential flow of instructions to said word control circuits; and
    (iii) an instruction control circuit coupled to said function control circuit to initiate, monitor the sequence of functions and issue commands to said function control circuit;
  (d) a plurality of multi-stage data serial shift registers responsive to said control circuit for storing data and instructions during program execution and a plurality of multi-stage error code serial shift registers, both of said pluralities having the same number and sequence of stages, such that each stage in each register has a position in its sequence of stages corresponding to a separate stage in the sequence of each other register;

(e) said two pluralities of registers operable to shift in synchronism bits in corresponding stages of the two pluralities of registers from a first stage to a last stage through their respective sequences of stages;

(f) an error code generator and comparator circuit operable to (i) generate and enter into the first stages of said error code shift registers a set of bits (error code), said error code being indicative of the corresponding set of bits (error correctable word) in the first stages of said data shift registers; error code in (ii) generate a separate second response to each error correctable word leaving the last stages of said data shift registers;

(iii) compare each second error code with its respective first error code to detect any bit change in its corresponding error correctable word; and (g) a select decode circuit responsive to said error code generator and comparator to correct the bit change in the error correctable word, the select decode circuit further comprising a plurality of select decodes, each said select decode being coupled to and containing an address of a corresponding data shift register.

16. A method of detecting and correcting errors occurring in the internal memory of a microprocessor during program execution, the method comprising the steps (a) advancing in synchronism a set of data bits in parallel through the memory;

(b) generating a first error code corresponding to said data set entering the memory and a separate second error code corresponding to said data set leaving the memory;

(c) comparing said second error code with said first error code to detect any error in said data set;

(d) correcting any error so detected in said data set leaving the memory.

17. A method of detecting and correcting bit errors occurring in a microprocessor memory during storage, the method comprising the steps of:

(a) advancing a set of parallel data bits (error correctable word) through corresponding stages in a plurality of multi-stage data serial shift registers;

(b) generating a first error code indicative of said error correctable word;

(c) advancing said first error code through stages in a plurality of error code serial shift registers having the same number of stages as the data serial shift registers;

(d) synchronizing both advances such that the first error code and the error correctable word are always in corresponding stages in their respective shift registers;

(e) generating a second error code corresponding to said error correctable word leaving said serial data shift registers and comparing said second error code with said first error code to detect any error occurring in said error correctable word during the advance of said error correctable word through said data serial shift registers; and (f) correcting any such error so detected in said error correctable word.

18. The method of claim 17 wherein said advancing step comprises:

(a) entering bits into a first stage of each said shift register; and (b) shifting said bits through the stages of said shift registers.

19. The method of claim 17 wherein said generating a set of parallel error code bits is generated by using single error correction double error detection techniques.

20. The method of claim 17 wherein said synchronizing step is accomplished by a continuous clock.

21. A microprocessor adapted for detecting and correcting random errors occurring in its memory; the device comprising:

(a) a means for synchronously advancing a parallel data bit set through said memory;

(b) an error code generation means to generate two separate error codes corresponding to the parallel data bit set entering and leaving said memory;

(c) an error code comparison means to compare said two error codes and to generate an error signal if there is not a match; and (d) a data correction means responsive to said error signal for correcting an error in said parallel data set leaving said memory.

* * * * *

UNITED STATES PATENT AND TRADEMARK OFFICE
CERTIFICATE OF CORRECTION

PATENT NO. : 4,866,718
DATED : September 12, 1989
INVENTOR(S) : Robert E. Fosdick It is certified that error appears in the above-identified patent and that said Letters Patent is hereby corrected as shown below:

Column 8, line 52, delete "cod", and insert therefor --code--.

Column 10, lines 7 and 8, delete "or responsive to said".

Column 10, line 9, after "comparator", insert --responsive to said--.

Signed and Sealed this

Twenty-eighth Day of August, 1990

Attest:

HARRY F. MANBECK, JR.

*Attesting Officer*  *Commissioner of Patents and Trademarks*